June 2, 1970     R. E. SMITH ET AL     3,515,876
METHOD AND APPARATUS FOR POSITIONING A RADIOACTIVE
STANDARD IN A RADIOACTIVE SAMPLE
COUNTING APPARATUS
Filed April 10, 1967     2 Sheets-Sheet 1
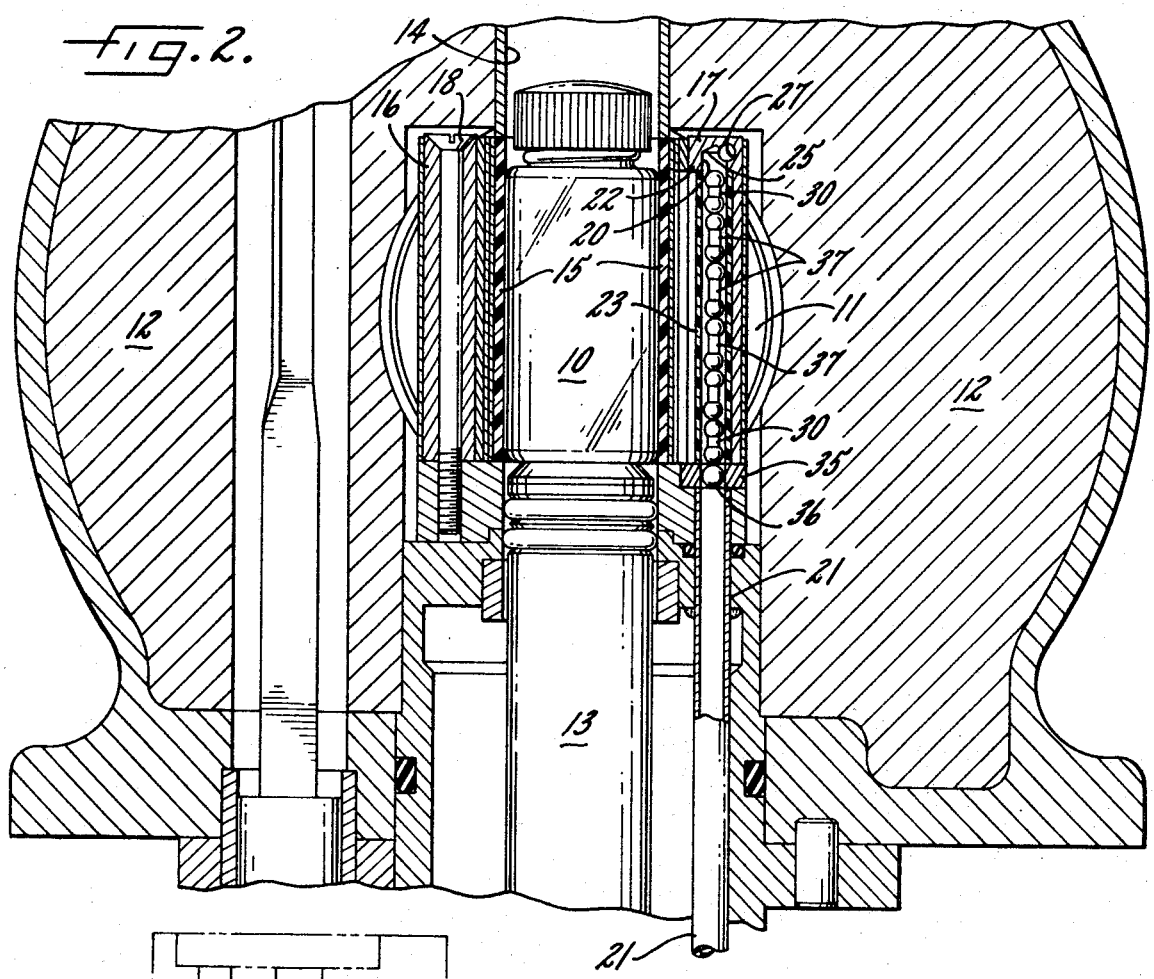
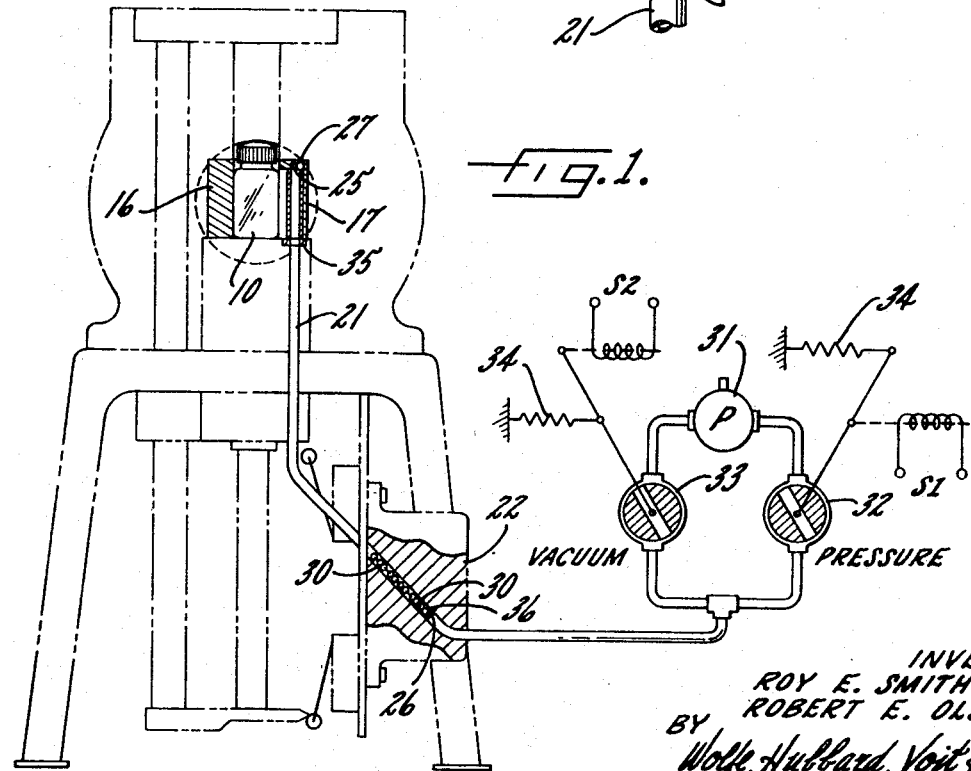
INVENTORS.
ROY E. SMITH
ROBERT E. OLSON
BY Wolfe, Hubbard, Voit & Osann
ATTORNEYS.

June 2, 1970   R. E. SMITH ET AL   3,515,876
METHOD AND APPARATUS FOR POSITIONING A RADIOACTIVE
STANDARD IN A RADIOACTIVE SAMPLE
COUNTING APPARATUS Filed April 10, 1967   2 Sheets-Sheet 2

INVENTORS.
ROY E. SMITH
ROBERT E. OLSON
BY Wolfe, Hubbard, Voit & Osann
ATTORNEYS.

United States Patent Office 3,515,876
Patented June 2, 1970

3,515,876
METHOD AND APPARATUS FOR POSITIONING A RADIOACTIVE STANDARD IN A RADIOACTIVE SAMPLE COUNTING APPARATUS
Roy E. Smith, Villa Park, and Robert E. Olson, Glen Ellyn, Ill., assignors to Packard Instrument Company, Inc., Downers Grove, Ill., a corporation of Illinois
Filed Apr. 10, 1967, Ser. No. 629,516
Int. Cl. G21h 5/00; G01t 1/20
U.S. Cl. 250—106                                  6 Claims

ABSTRACT OF THE DISCLOSURE

A pneumatic system is described for shifting a radioactive standard source from a remote location into a scintillation counting chamber in which the standard source is located and retained within the counting chamber by magnetic attraction.

This invention relates in general to liquid scintillation spectral analysis of test samples containing one or more radioactive isotopes disposed in a liquid scintillator. More particularly, it relates to a technique of automatically positioning an external standard radioactive source with respect to the counting chamber wherein the test samples are counted.

In liquid scintillation counting procedures, several techniques have heretofore been employed for compensating for the various sources of error which affect counting accuracy. These sources include quenching, instrument drift, and line voltage drift. Representative techniques are disclosed and described in detail in U.S. Pat. 3,188,468 issued to Lyle E. Packard on June 8, 1965, and assigned to the assignee of the present invention. In this patent various procedures and apparatus are described for automatically performing two separate counting cycles on each radioactive sample, during one of which cycles the sample is exposed to a known standard source of radioactive energy. From the data recorded during the two separate counts it is possible to determine the true activity level of the sample. This is done by performing arithmetical computations, or more commonly by comparing the observed counts with previously prepared calibration curves.

Other techniques may also be employed to compensate for counting errors which arise from the geometry of the apparatus in which the radioactive source is located with respect to the sample to be counted. A technique for diminishing or eliminating such errors is described in the application of Robert E. Cavanaugh, Jr., Ser. No. 541,721, filed Apr. 11, 1966. Without describing this technique in detail, it will suffice to say that Cavanaugh causes the standard radioactive source to be placed in proximity to the sample container during the additional counting cycle in a manner which reduces or eliminates the effects of varying sample volumes. For example, the source may be separated into two components having different characteristic radiation energies which are spaced from each other and thereby subject the sample container to radiation from two different directions. The point of these techniques is to eliminate the requirement of a family of calibration curves dependent on sample volume and other common experimental variables. By these improvements, a small family of curves, or only a single curve, can be used to account for the many experimental variables which are commonly encountered during the counting process.

For automatic operation it is necessary to provide the counting and sample changing apparatus with means for shifting the known external standard source in to a position wherein it can have the desired effect on the sample. Whatever type of source is used, it should be quickly and reliably shiftable from a precisely located predetermined counting position within the sample chamber adjacent the sample to be counted into a shielded position remote from the counting chamber wherein the radioactive emissions of the source will have negligible effect on the counting process.

By the present invention, therefore, it is intended to provide a method and apparatus for positioning a radioactive standard for use with means for automatically shifting the external radioactive standard source between an inoperative position and an operative position adjacent the sample to be counted. It is contemplated that this end will be achieved with a minimum of mechanical or moving parts, especially in the vicinity of the counting chamber itself.

It is furthehr intended that the source-shifting device of the present invention be adapted for pulsed pneumatic operation in which short pulses of pressure (rather than continuous pressurization) are used to shift the radioactive sample source from the operative to the inoperative positions and back again.

In addition to these objectives, it is intended that the sample-changing technique of the present invention be easily adaptable for automatic operation as a part of an overall electrical control system by the use of solenoid valves and the like. As a further object, it is contemplated that the system of the present invention will accommodate not only single radioactive sample sources, but multiple sources disposed in distributed spatial arrangement as well.

Other objects and advantages will be apparent from the accompanying drawings, in which:

FIG. 1 is a schematic diagram of a liquid scintillation detection apparatus employing a means constructed according to the present invention for shifting a radioactive standard source between an operative and an inoperative position with respect to the counting chamber;

FIG. 2 is a fragmentary section of a liquid scintillation detector counting chamber with a sample vial in counting position and an external radioactive standard source positioned adjacent the sample;

Figure 4:
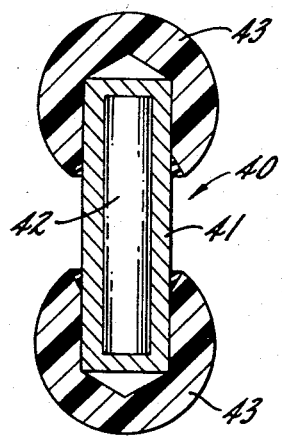
FIG. 4 is a radioactive standard source for use in the present invention.

While the invention will be described in connection with certain illustrative embodiments, it will be understood that we do not intend to limit the invention to those embodiments or procdures, but intend to cover all alternative and equivalent constructions and methods as may be included within the spirit and scope of the invention as defined by the appended claims.

Turning first to FIG. 1, there is shown in schematic form a radioactive standard positioning mechanism constructed according to the present invention, in conjunction with a liquid scintillation detection system including a shielded counting chamber and automatic sample-changing means (shown in phantom). A sample-changing means (shown in phantom). A sample-changing mechanism of the type disclosed in the aforementioned Packard Pat. No. 3,188,468 is shown.

In carrying out the spectral analysis of a sample radioactive substance, the material to be examined is placed with the liquid scintillator in a sample jar or vial 10. The sample generally consists of a beta emitter. This type of emitter creates light flashes in the scintillator which are then picked up and amplified by photomultiplier tubes within the counting apparatus. The standard source used in conjunction with such a sample is generally a gamma emitter which causes additional scintillations through the generation of secondary beta radiation within the liquid scintillator itself.

In the illustrated counting chamber, the sample vial 10 is positioned between a pair of facing photomultiplier tubes 11. The vial 10, photomultipliers 11, and other apparatus in the immediate area of the counting chamber are surrounded by shielding 12 to prevent the leakage of radiation from the standard and sample and to also attenuate any spurious radiation from outside sources which would increase the background count. Briefly, the sample-changing mechanism consists of a slidable ram 13 which is raised or lowered within a bore 14 to move the sample vial 10 in and out of the counting chamber between the photomultipliers 11. At the top of the apparatus is a vial-changing mechanism (now shown) which serves to remove the vial after counting is completed and to insert the next vial of sample material. A light shutter (not shown) serves to close off the counting chamber from extraneous light which would otherwise disrupt the operation of the photomultiplier tubes.

In the immediate region of the sample vial 10 there is preferably located a block of clear plastic 15 or other transparent material which is positioned against the face of the photomultiplier tubes 11 and acts as a light pipe to more efficiently transmit light from scintillations within the sample vial to the photomultipliers. Surrounding the sample vial 10 except where penetrated by the transparent block 15 is a casing 16, held in place by bolts 18 or other suitable fasteners. At one side 17 of the casing 16 there is disposed a bore 20 which connects with a conduit tube 21 to link the counting chamber with a remotely-located shield block 22 through which the conduit tube 21 passes.

Within the bored-out side 17 an elongate opening or window 22 is cut which opens into communication with the transparent block 15 and sample vial 10. The conduit is maintained unbroken, however, by a length of thin tubing 23. The tubing 23 is preferably made of a low density material, such as aluminum, so that it presents a minimum amount of interference to the passage of radiation from a standard radioactive source into the sample vial 10 from within the bored-out side 17 of the casing 16.

An internal shoulder or stepped-down portions 25, 26 is provided at each end of the conduit. At the end adjacent the counting chamber there is also a small bore or vent 27 drilled through at a right angle to the larger bore 20. At the opposite end of the conduit within the shield block 22, the internal shoulder 26 in the illustrated embodiment comprises a perforated plug. The requirement of the shoulders 25, 26 is that they furnish a positive stop at each end of the conduit without impeding the flow of pressurizing fluid.

Standard source pellets 30 of a known radioactive source are placed within the conduit. The pellets 30 are sized to freely slip through the conduit while being incapable of passing the shoulders 25, 26 at the opposite ends of the conduit. The conduit is then connected to a supply of pressurizing fluid which in the embodiment illustrated in FIG. 1 comprises a pump 31. The pump 31 is alternately connectable to the conduit tube 21 by either a vacuum solenoid valve 32 or a pressurizing valve 33. These valves 32, 33 are selectively operable by circuit means through solenoids S–1 and S–2, respectively, and are returned to the normal (closed) position by springs 34. When the pressurizing valve 32 is actuated a pulse of pressurizing fluid (such as air) is sent through the conduit tube 21 which drives the source pellets 30 upward into the counting chamber until they abut the upper internal shoulder 25. When the vacuum valve 33 is actuated, a vacuum is drawn in the conduit tube 21 which causes atmospheric pressure to enter the bore 27 at the end of the conduit adjacent the counting chamber, thereby forcing the source pellets 30 back into the shield block 22 until they abut the lower internal shoulder or plug 26. With the construction described thus far, which is substantially that disclosed in the Packard Pat. No. 3,188,468, previously mentioned, the source pellets 30 must be held in operative relationship to the counting chamber and sample vial 10 by the continuous application of pressure through the pressure valve 32.

According to the present invention, however, the source pellets 30 are shifted upward into the counting chamber by a momentary pulse of fluid pressure, and are retained there in a precise predetermined operative position after the source of pressure is removed. The source pellets 30 remain in this position until returned to the shield block 22 by another pulse. For this purpose, a small toroidal permanent magnet 35 is located adjacent and slightly below the sample vial 10. To support the source pellets 30 in the proper predetermined operative position for the desired radioactive interaction with the sample vial 10, an additional slug 36 made of magnetically attractable material is then included in a train of source pellets 30 and spacer pellets 37. In the embodiment illustrated in FIG. 2, the magnetic slug 36 comprises a simple steel ball, such as used in ball bearings.

The initial pulse of pressure from momentary actuation of the pressure valve 32 drives the train of source pellets 30 and spacer pellets 37 upward into the counting chamber until stopped by the upper internal shoulder 25. Upon release of the pressure, the train of pellets falls a short distance by gravity until the magnetic slug 36 comes within the attractive range of the toroidal magnet 35, and is thereby captured. In this manner the entire train of pellets is accurately and positively supported for the duration of the succeeding counting cycle.

When the next counting cycle has concluded and it is desired to return the source pellets 30 to the shield block 22, the vacuum solenoid valve 33 is momentarily actuated, thereby allowing atmospheric pressure to enter the bore 27 adjacent the upper shoulder 25 and to drive the train of pellets downward. The magnetic slug 36 is thereby broken away from the grip of the toroidal magnet 35 and the train of pellets returns, by the action of the atmospheric pressure, gravity, or both, to the shield block 22 where it is arrested by the lower internal shoulder 26.

Figures 5, 6:
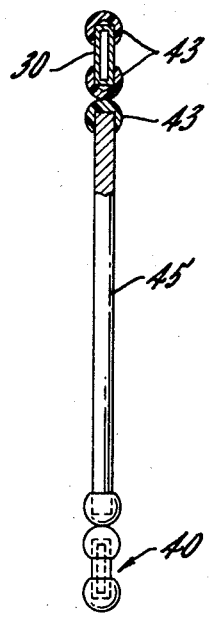
FIG. 5 is an alternative radioactive standard source arrangement.
FIG. 6 is a second alternative radioactive standard source arrangement.

The embodiment described thus far has utilized individual source pellets 30 separated by spacer pellets 37 carried into position and retained by a magnetic slug 36 which comprises a steel ball. Alternative configurations are also possible as illustrated in FIGS. 4, 5 and 6. In FIG. 4 a single source pellet is illustrated having a jacket 41 of magnetic material so that the source pellet itself is retained in position by the magnet 35 in the same manner as the separate magnetic slug 36. The magnetic jacket 41 surrounds a core 42 of the radioactive source material. At each end of the pellet 40, as with the other pellets, is a spherical bumper 43 of antifriction plastic, giving the pellets a dumbbell-shaped appearance. The spherical bumpers 43 also allow the pellets to slide freely and easily through the curves of the conduit tube 21.

Figure 3:
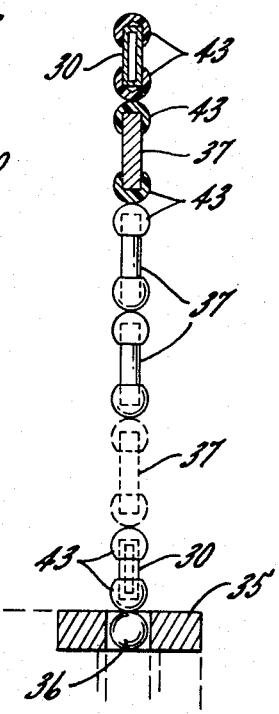
FIG. 3 is an enlarged partial section of the radioactive standard source illustrated in FIG. 2 shown in conjunction with the magnetic supporting means of the invention.

In FIG. 5 there is illustrated an alternative configuration in which the individual smaller dumbbell-shaped spacers 37 of FIG. 3 may be replaced by a single elongate spacer 45. In FIG. 6 there is illustrated a further modification in which the individual radioactive source elements 46 are implanted at opposite ends of a single elongate pellet 48, which in this case is incorporated with a magnetic pellet 36 as in the first embodiment.

It will be recalled that the embodiment illustrated in

Figure 7:
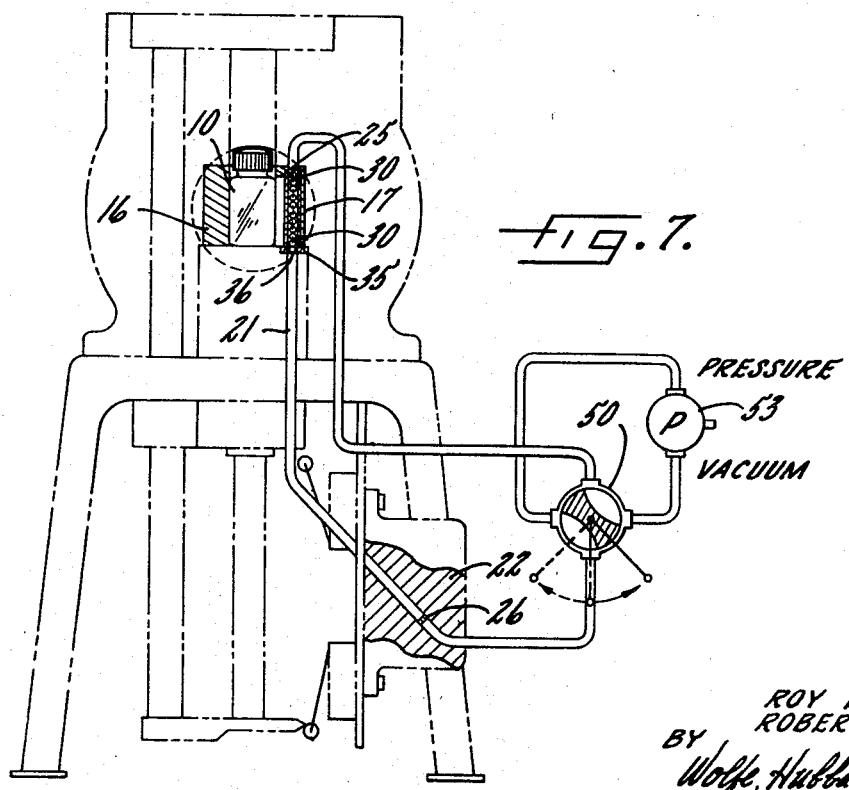
FIG. 7 is a schematic similar to FIG. 1 illustrating a source-changing mechanism constructed according to an alternative embodiment of the present invention.

FIG. 1 used vacuum to return the train of pellets to the shield block 22 thereby utilizing atmospheric pressure as a supply of pressurizing fluid. In FIG. 7, however, there is illustrated an alternative embodiment in which the supply of pressurized fluid is utilized to positively shift the train of pellets in both directions from one end of the conduit to the other without the need to rely on atmospheric pressure. In this embodiment, a single valve 50 having three operative positions is utilized. In the first position, as shown in FIG. 7, a pump 51 is the source of pressure and directs pressurizing fluid into the lower end of the conduit tube 21 in order to drive the train of pellets up into the counting chamber. When shifted to the second operating position (not shown) the valve 50 cuts off the pressure from the pump 51 and allows the train of pellets to drop slightly until the magnetic pellet 36 is captured by the magnet 35, and the train of pellets is thereby held in operative position as with the previously described embodiment. When it is desired to return the pellets to the shield block 22 the valve 50 is shifted to its third alternate position in which the supply of pressurizing fluid is applied to the upper end of the conduit, thereby forcing the train of pellets away from the grip of the magnet 35 and returning them to the shield block 22.

We claim as our invention:

1. In a radioactivity spectrometry apparatus, apparatus for shifting a standard radioactive source between a shielded position and a counting position, comprising, in combination:

a conduit having at one end an upward-extending termination in operative proximity to said counting chamber, said upward-extending termination having a first internal shoulder, said conduit having at an opposite end a downward-extending termination in shielded relationship to said counting chamber, said downward-extending termination having a second internal shoulder, a standard radioactive source and a slug of magnetically attractable material in supporting relationship to said source, both being slidably disposed within said conduit and incapable of passing said shoulder, a permanent magnet adjacent said conduit at said upward-extending first termination, a supply of pressurized fluid and valve means connecting said supply and said conduit for selectively pressurizing the opposite ends of said conduit for shifting said source and said slug between said shoulders, and control means for operating said valve means to remove said pressurization when said slug is within the attractive range of said magnet.

2. Apparatus as defined in claim 1 in which said control means is effective to supply momentary pulses of pressurization to engage and disengage said slug relative to the attractive range of said magnet.

3. Apparatus as defined in claim 1 in which said slug and said source are integral within a single slidable pellet.

4. Apparatus as defined in claim 3 in which said source is encapsulated within said slug.

5. The method of shifting a sample radioactive source between a shielded position and a counting position, said positions being at predetermined points along a conduit and said source being supportably associated with a slug of magnetically attractable material, comprising the steps of introducing a pulse of pressurized fluid at an end of said conduit associated with said shielded position to propel said source and slug through said conduit to said counting position, retaining said source and said slug in said counting position by a permanent magnet for the duration of a counting period, and returning said slug and said source to said shielded position by a pulse of pressurized fluid when said counting period has elapsed.

6. The method defined in claim 5 in which said pulse of pressurized fluid returning the slug and source to the shielded position is created by applying a momentary vacuum to the end of said conduit associated with said shielded position and allowing the end on the other side of said slug and source to be exposed to atmospheric pressure.

References Cited
UNITED STATES PATENTS

| | | |
|---|---|---|
| 3,123,713 | 3/1964 | Maud et al. |
| 3,188,468 | 6/1965 | Packard. |

ARCHIE R. BORCHELT, Primary Examiner

U.S. Cl. X.R.

250—71.5